H. H. RUSSELL.
SHOCK ABSORBER.
APPLICATION FILED APR. 30, 1917.
1,333,449.                                   Patented Mar. 9, 1920.
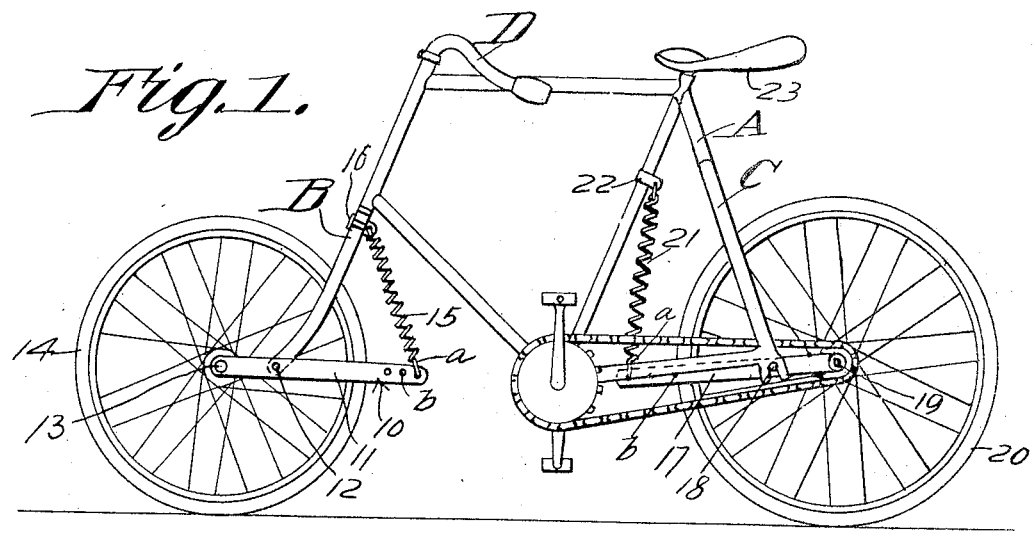
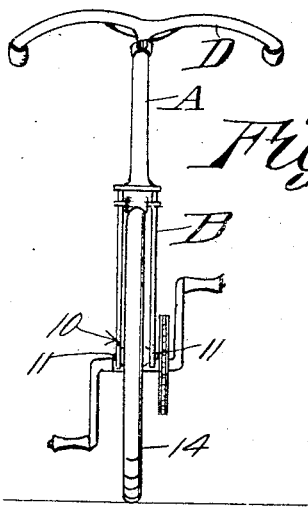
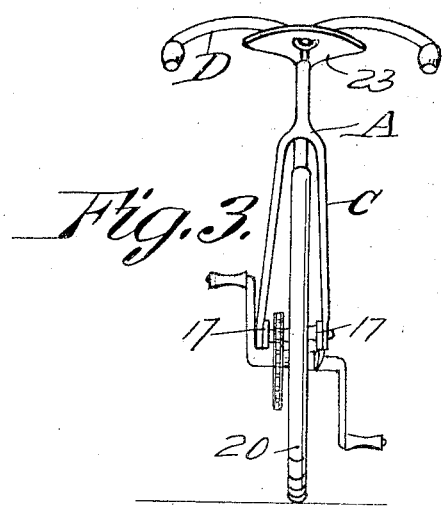
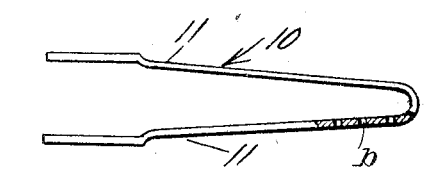
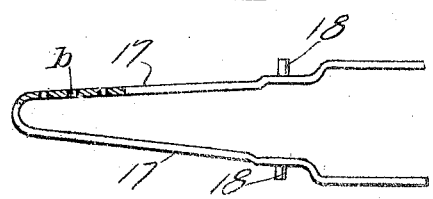
Inventor
Henry H. Russell,
By Talbert & Parker
Attorneys

UNITED STATES PATENT OFFICE.

HENRY HORTON RUSSELL, OF BAGLEY, IOWA.

SHOCK-ABSORBER.

1,333,449.　　　　Specification of Letters Patent.　　Patented Mar. 9, 1920.

Application filed April 30, 1917. Serial No. 165,491.

*To all whom it may concern:*

Be it known that I, HENRY HORTON RUSSELL, a citizen of the United States, residing at Bagley, in the county of Guthrie and State of Iowa, have invented certain useful Improvements in Shock-Absorbers, of which the following is a specification, reference being had therein to the accompanying drawing.

The invention relates to bicycles, motorcycles or the like, and more particularly to the class of shock absorbers for such cycles.

The primary object of the invention is the provision of a shock absorber of this character wherein the same can be mounted on the front and rear forks of the bicycle, motorcycle or the like, and will serve to absorb all shocks and jars incident to the travel thereof, thereby assuring comfort to the rider and also relieving any excessive strains upon the frame of the bicycle, motorcycle or the like.

Another object of the invention is the provision of a shock absorber of this character wherein the necessity of altering the frame and forks of the bicycle, motorcycle or the like is eliminated and permits the convenient application to or the removal therefrom.

A further object of the invention is the provision of a shock absorber of this character which is simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a side elevation of a bicycle, showing the shock absorber constructed in accordance with the invention applied;

Fig. 2 is a front elevation;

Fig. 3 is a rear elevation;

Fig. 4 is a plan view of the front wheel yoke of the shock absorber;

Fig. 5 is a plan view of the rear wheel yoke of the shock absorber.

Similar reference characters indicate corresponding parts throughout the several views of the drawing.

Referring to the drawing in detail, A designates the frame of a bicycle which is of the ordinary well known construction, although the same may be of the motorcycle type; B, the front fork; C, the rear forks and D the steering handle-bars which permit the steering of the front fork B, the shock absorber being applied to the front and rear forks in a manner presently described.

The shock absorber comprises a substantially U-shaped front wheel yoke 10 which has its side limbs 11 pivoted at 12 to the lower ends of the front fork B, the pivots 12 being removed from the free ends of the limbs 11, in which is journaled the axle 13 of the front steering wheel 14, while at the closed end of the yoke 11 are connected coiled tension springs 15 which are also connected to a clamp 16 engaged on the crown of the front fork B, the springs 15 being provided with hooks *a* for detachably engaging in any one of the holes *b* in the closed end of said yoke, as shown in Fig. 1 of the drawing.

On opposite sides of the rear fork C are arranged the levers 17 of the rear shock absorber, which levers are pivoted at 18, spaced from the rear ends, to the rear forks C, and in the rear ends of these levers is journaled the axle 19 of the rear wheel 20, while connected to the forward ends of said levers 17 are coiled tension springs 21, the same being also connected to a clamp 22 engaged on the bar of the frame A in which is mounted the stem of the seat 23, as usual. The springs 21 being provided with the hooks *a* for detachable engagement in any one of the series of holes *b* in said levers, it will be noted that the springs 15 and 21 can be readily adjusted.

It will be observed that the means provided for adjusting the points of connection of the springs 16 and 21 with their respective yokes serve to provide for increasing or diminishing the leverage which the yokes have upon the springs. This construction makes for the attainment of a uniform resisting power to be had by the springs, though the load carried upon the seat 23 be light or heavy. For example, if a light person be riding on the seat 23, the springs 15 and 21 should be engaged with the outermost holes $b$, as shown in Fig. 1. If a heavier person should desire to ride on the seat 23, the springs may be detached and engaged with one or the other of the holes $b$ nearer the pivotal connections 12 and 18, whereupon the leverage previously had on the springs is reduced and their power thereby to resist the heavier weight increased.

It will be noted that the front and rear wheels of the bicycle are yieldably supported by the shock absorbers and all shocks and jars will be absorbed thereby when the bicycle is in use, thus relieving any strains from the frame of the latter and also avoiding undue shocks and jars to the rider thereof.

From the foregoing description, taken in connection with the accompanying drawing, the construction and operation of the herein described shock absorber will be readily apparent and, therefore, a more extended explanation has been omitted.

Having thus described my invention, I claim:

The combination with a bicycle frame having front and rear forks and front and rear wheels, of U-shaped yokes straddling the wheels and connected with the axles thereof, means for pivotally connecting the two yokes respectively with the said front and rear forks, the said pivotal connections standing nearer those ends of the yokes connecting with the axles than at the remaining ends of the yokes, clamps attached to the bicycle frame, and springs each having one end connected with one of the clamps and the remaining end terminating in a hook, the yokes adjacent those ends remote from the axles being formed with a plurality of holes engageable by the hooks carried by the springs, whereby those ends of the springs connecting with the yokes may have the points of such connections varied to increase or diminish the leverage on the springs for the useful purpose specified.

In testimony whereof I affix my signature.

HENRY HORTON RUSSELL.